United States Patent [19]

Niino

[11] Patent Number: 5,344,875

[45] Date of Patent: Sep. 6, 1994

[54] WEAR-RESISTANT POLYOXYMETHYLENE RESIN COMPOSITION AND METHOD FOR MAKING SAME

[75] Inventor: Masahiko Niino, Kurashiki, Japan

[73] Assignee: Asahi Kasei Kogyo Kabushiki Kaisha, Osaka, Japan

[21] Appl. No.: 26,190

[22] Filed: Mar. 1, 1993

Related U.S. Application Data

[63] Continuation of Ser. No. 616,916, Nov. 21, 1990, abandoned.

[30] Foreign Application Priority Data

Nov. 28, 1989 [JP] Japan ................... 1-306611

[51] Int. Cl.$^5$ .................. C08L 23/04; C08L 59/00; C08L 75/04
[52] U.S. Cl. ......................... 525/64; 525/70; 525/125; 525/155; 525/399; 525/400; 525/401
[58] Field of Search .............. 525/125, 155, 399, 400, 525/401, 64, 70

[56] References Cited

U.S. PATENT DOCUMENTS

| | | | |
|---|---|---|---|
| 3,670,050 | 6/1972 | Castner et al. | 525/399 |
| 3,697,624 | 10/1972 | Braunstein | 525/399 |
| 3,795,715 | 3/1974 | Cherdron et al. | |
| 4,556,690 | 12/1985 | Nakagawa | |
| 5,004,784 | 4/1991 | Huynh-Ba | 525/399 |

FOREIGN PATENT DOCUMENTS 0124879 11/1984 European Pat. Off.
1299813 12/1989 Japan.

OTHER PUBLICATIONS

6001, Chemical Abstracts, vol. 81, No. 22, Nov. 2, 1974 Ishida et al.
Partial translations of JP-42-19498, JP-B-55-23304, JP-B-57-15616, JP-A-59-64654, JP-A-1-299813 and JP-A-59-204652.

*Primary Examiner*—James J. Seidleck
*Assistant Examiner*—Thomas Hamilton, III
*Attorney, Agent, or Firm*—Birch, Stewart, Kolasch & Birch

[57] ABSTRACT

The present invention provides a polyoxymethylene resin composition which is excellent in wear resistance and is suitable as materials for various sliding parts. The composition comprises (A) 65–98.8% by weight of a polyoxymethylene resin, (B) 0.2–5.0% by weight of a polyfunctional isocyanate compound, (C) 0.5–20% by weight of an olefin polymer containing 30% by weight or more of ethylene and a functional group containing an active hydrogen, and (D) 0.2–10% by weight of polyethylene.

14 Claims, No Drawings

WEAR-RESISTANT POLYOXYMETHYLENE RESIN COMPOSITION AND METHOD FOR MAKING SAME

This application is a continuation of application Ser. No. 07/616,916 filed on Nov. 21, 1990, now abandoned.

BACKGROUND OF THE INVENTION

1. Field of the Invention

The present invention relates to a novel wear-resistant polyoxymethylene resin composition and a process for producing it. More particularly, the present invention relates to a wear-resistant polyoxymethylene resin composition which especially has excellent wear resistance and is suitable as a material for the manufacture of precision machine parts, office automation devices and sliding automobile parts, and an efficient process for the production thereof.

2. Related Art

Hitherto, polyoxymethylene resins have been widely used for the manufacture of various machine parts and office automation devices. These resins are engineering resins having well-balanced mechanical properties and excellent wear resistance.

However, the inherent wear resistance of the polyoxymethylene resin material is not necessarily satisfactory for sliding parts and accordingly, their use is limited. Thus, improvement of wear resistance in this connection has been demanded.

Under these circumstances, various processes have been proposed for improving wear resistance of polyoxymethylene resin. For example, addition of 1,4-butanediol and fatty acid ester to polyoxymethylene resin (Japanese Patent Kokoku No. 55-23304) and addition of boric acid ester of fatty acid glycerine monoester (Japanese Patent Kokoku No. 57-15616) to polyoxymethylene have been proposed, but these processes do not sufficiently improve the wear resistance.

The following processes have been proposed for improvement of impact resistance of polyoxymmethylene resin. That is, a process of adding an olefin copolymer of an α-olefin and a glycidyl ester of α,β-unsaturated acid to polyoxymethylene resin (Japanese Patent Kokai No. 59-64654), a process of adding a modified α-olefin polymer to polyoxymethylene resin (Japanese Patent Kokai No. 59-204652), and a process of coupling polyoxymethylene resin and a functional ethylene copolymer with an isocyanate compound (Japanese Patent Kokai No. 1-299813). However, the objectives of these processes are not directed toward the improvement of wear resistance and thus such improvement of wear resistance cannot be expected.

A process of adding polyolefin to polyoxymethylene resin has been proposed for improving Young's modulus (Japanese Patent Kokoku No. 42-19498), but the objective of this process also is not directed toward the improvement of wear resistance and furthermore, the process actually results in a deterioration of wear resistance.

SUMMARY OF THE INVENTION

The object of the present invention is to provide a wear-resistant polyoxymethylene resin composition especially superior in wear resistance and suitable as materials for the manufacture of various sliding parts.

As a result of intensive research conducted by the present inventors in an attempt to develop polyoxymethylene resin compositions superior in wear resistance, it has been found that the above object can be attained by adding to the polyoxymethylene resin, a polyfunctional isocyanate compound, a specific olefin polymer having as functional group containing an active hydrogen, and polyethylene, at a specific ratio and melt kneading them under specific conditions. Thus, the present invention has been accomplished.

More particularly, the present invention provides a wear-resistant polyoxymethylene resin composition which comprises (A) 65–98.8% by weight of a polyoxymethylene resin, (B) 0.2–5.0% by weight of a polyfunctional isocyanate compound, (C) 0.5–20% by weight of an olefin polymer comprising at least 30% by weight of ethylene and a functional group containing an active hydrogen, and (D) 0.2–10% by weight of polyethylene and a process for producing the composition.

According to the present invention, the wear-resistant polyoxymethylene resin composition can be produced by melt kneading a mixture comprising component (A), component (B), component (C), and component (D) at the above ratios and at a maximum resin temperature of 210° C. or higher for 0.5 minutes or more.

DETAILED DESCRIPTION OF PREFERRED EMBODIMENTS

The present invention will be explained in detail below.

The polyoxymethylene resins used as component (A) may be oxymethylene homopolymers substantially comprising oxymethylene units which are obtained by polymerizing formaldehyde monomer or cyclic oligomers such as trimers (trioxane) and tetramers (tetraoxane) of formaldehyde or oxymethylene copolymers containing 0.1–20% by weight of oxyalkylene units of 2–8 carbon atoms which are obtained by copolymerizing the above-mentioned compounds with cyclic ethers such as ethylene oxide, propylene oxide, epichlorohydrin, 1,3-dioxolan, formal of glycol and formal of diglycol. The copolymers may have branched molecular chain. Furthermore, the copolymers may be oxymethylene block copolymers containing 50% by weight or more of a segment comprising oxymethylene units and 50% by weight or less of another polymer segment.

The content of polyoxymethylene resin (A) must be within the range of 65–98.8% by weight. If it is less than 65% by weight, the inherent properties of the polyoxymethylene resin are lost and the object of the present invention cannot be sufficiently attained.

The polyfunctional isocyanate compounds used as component (B) are compounds having two or more isocyanate groups or isothiocyanate groups in the molecule. These compounds include, for example, a diisocyanate compound such as hexamethylene diisocyanate (HMDI), biuret-modified HMDI trimer (trifunctional), modified HMDI trimer having isocyanurate ring (trifunctional), modified urethane obtained by reacting trimethylolpropane with 3 mols of HMDI (trifunctional), modified urethane obtained by reacting butanediol with 2 mols of HMDI (bifunctional), cyclohexylene diisocyanate, dicyclohexylmethane diisocyanate, isophorone diisocyanate, modified trimer of isophorone diisocyanate having isocyanurate ring (trifunctional), phenylene diisocyanate, tolylene diisocyanate, xylylene diisocyanate, naphthalene diisocyanate, diphenylmethane diisocyanate, dimethyldiphenylmethane diisocyanate, and dimethyldiphenylene diisocyanate; triisocyanate compounds such as triphenylmethane triisocyanate and benzene triisocyanate; isothiocyanate compounds corresponding to these isocyanate compounds; polymers of the above diisocyanate compounds such as dimers and trimers; hydrogenated products of the above aromatic isocyanate compounds; the above isocyanate compounds substituted with substituents such as alkyl group, allyl group, aryl group, and group containing hetero atom; isomers of above isocyanate compounds; and reaction products of the above isocyanate compounds with compounds having alcohol or carboxylic acid group which have a molecular weight of 3000 or less (in which 2 mols or more of isocyanate group remains). Of these compounds, trifunctional isocyanate compounds are preferred and trifunctional isocyanate compounds obtained by modification of HMDI or isophorone diisocyanate are more preferred. Among them, especially preferred are modified isophorone diisocyanate trimer having isocyanurate ring (trifunctional), modified hexamethylene diisocyanate trimer having isocyanurate ring (trifunctional), and derivatives thereof. These isocyanate compounds may be used singly or in combination of 2 or more.

The amount of this polyfunctional isocyanate compound (B) must be within the range of 0.2–5.0% by weight. If the amount is less than 0.2% by weight, sufficient improvement of the wear resistance cannot be attained and if it is more than 5.0% by weight, the wear resistance of the composition decreases and furthermore, the processability conspicuously deteriorates. In order to exhibit the effect of the present invention sufficiently, the amount of the isocyanate compound is preferably 0.5–4.0% by weight, more preferably 1.0–3.0% by weight.

In the present invention, olefin polymers which comprise 30% by weight or more of ethylene and a functional group containing an active hydrogen are used as component (C). The functional groups containing active hydrogen include, for example, a hydroxyl group, carboxyl group, amide group and amino group. These olefin polymers may contain one or more of these functional groups.

The olefin polymers include, for example, modified ethylene copolymers such as ethylene-vinyl acetate copolymer, the vinyl acetate group of which is partially hydrolyzed and ethylene-glycidyl (meth)acrylate copolymer, the glycidyl group of which is partially hydrolyzed and ethylene copolymers such as ethylene-acrylamide copolymer, ethylene-allyl alcohol copolymer, ethylene-allylamine copolymer, ethyleneacrylic acid copolymer, ethylene-hydroxymethacrylate copolymer, ethylene-hydroxyacrylate copolymer, and ethylene-vinyl-p-aminobenzene copolymer.

Furthermore, these modified ethylene copolymers and ethylene copolymers may be those which are copolymerized with a third comonomer, namely, at least one comonomer selected from α-olefins other than ethylene and represented by the formula (I):

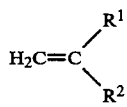
(I)

wherein $R^1$ and $R^2$ each represents a hydrogen atom, an alkyl group, an aryl group, a substituted alkyl group or a substituted aryl group and $R^1$ and $R^2$ may be identical or different with a proviso that both of $R^1$ and $R^2$ cannot be simultaneously a hydrogen atom, vinyl carboxylates such as vinyl acetate, and α,β-unsaturated carboxylic acid esters such as acrylic esters and methacrylic esters. These comonomers are preferably propylene, butene-1, styrene, methyl methacrylate, methyl acrylate, acrylonitrile, vinyl acetate, cyclopentadiene, ethylidene norbornane, and 1,4-hexadiene.

The ethylene content comprised in these modified ethylene copolymers and ethylene copolymers must be at least 30% by weight. If the content is less than 30% by weight, the resulting composition is considerably inferior in wear resistance. The content is preferably 50% by weight or more, and more preferably 80% by weight or more. With an increase in the ethylene content, the wear resistance of the composition would be enhanced.

Furthermore, the average molecular weight ($\overline{Mn}$) of the modified ethylene copolymers and ethylene copolymers is preferably 20,000–500,000, more preferably 30,000–200,000 from the point of wear resistance.

The ethylene copolymers can be produced by the usual high-pressure radical polymerization process. For example, they can be produced by a process which comprises contacting and polymerizing the monomers simultaneously or stepwise in a tank type or tube-type reactor in the presence of a free-radical initiator in an amount of 0.001–1% by weight based on total amount of the monomers, a chain transfer agent and, if necessary, an aid under a polymerization pressure of 500–4,000 kg/cm$^2$, preferably 1000–3500 kg/cm$^2$ and at a reaction temperature of 50°–400° C., preferably 100°–350° C.

The free-radical initiators include those which are customarily used such as peroxides, hydroperoxides, azo compounds, amine oxide compounds and oxygen.

The olefin polymer (C) comprising at least 30% by weight of ethylene and a functional group containing an active hydrogen further include waxes having a functional group containing an active hydrogen, such as polyethylene wax having carboxyl groups and polyethylene wax having hydroxyl groups. These polyethylene waxes preferably have an average molecular weight of 500–10,000 from the point of wear resistance.

The polyethylene waxes having carboxyl groups preferably have an acid value (AV) of 10–300 mg KOH/g.

These polyethylene waxes having carboxyl groups are produced, for example, by a process of introducing an acidic group into a polyethylene wax by an oxidation reaction, a process which comprises decomposing polyethylene wax by oxidation, and a process which comprises introducing a monomer having an acidic group at the time of polymerization of the polyethylene wax. Specifically, the processes disclosed in Japanese Patent Kokoku Nos. 43-9367, 43-9368, and 47-49314 can be employed.

On the other hand, polyethylene waxes having hydroxyl groups can be produced by reducing polyethylene waxes having carboxyl groups.

The olefin polymer comprising at least 30% by weight of ethylene and a functional group containing an active hydrogen further include olefin polymers to which a monomer having a functional group containing an active hydrogen is added.

As the olefin polymers of the olefin polymers to which a monomer having a functional group containing an active hydrogen is added, there may be used polyethylene and olefin copolymers comprising at least one comonomer having functional group containing an active hydrogen and ethylene. The olefin polymers are preferably those which comprise at least 90% by weight of ethylene and 10% by weight or less of a vinyl monomer polymerizable therewith, such as butene-1 or propylene. Among these olefin polymers, especially preferred are those which have a number-average molecular weight of 2,000–1,000,000, a specific gravity of 0.91–0.98 and a melting point of 100°–140° C. Examples thereof are commercially available polyethylene waxes, low-density polyethylene (LDPE), linear low-density polyethylene (LLDPE), high-density polyethylene (HDPE), and ultrahigh molecular weight polyethylene (UHPE). Among these polyethylene waxes, considering wear resistance, preferred are LDPE which is an ethylene homopolymer having a number-average molecular weight of 20,000–500,000 and a density of 0.91–0.93 g/cm$^3$ and UHPE which is an ethylene homopolymer having a number-average molecular weight of 20,000–500,000 and a density of 0.93–0.96 g/cm$^3$ and LDPE is especially preferred.

On the other hand, the olefin copolymers are preferably those which have a number-average molecular weight of 20,000–500,000, preferably 30,000–200,000 from the point of wear resistance. Examples of preferred copolymers are ethylene-propylene copolymer and ethylene-propylene-diene copolymer.

The ethylene-propylene-diene copolymer preferably has 3–20 double bonds per 1000 carbon atoms as the degree of unsaturation, a Mooney viscosity of 30–125 (1–4/100° C.) and an ethylene content of 30–80% by weight.

These ethylene-propylene copolymer and ethylene-propylene-diene copolymer are obtained, for example, by a polymerization process using a vanadium or titanium type Ziegler catalyst.

As to the monomers to be added olefin polymers, these monomers include, for example, α,β-unsaturated carboxylic acid esters containing a hydroxyl group which are represented by the formula (II):

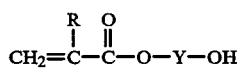

wherein R represents a hydrogen atom, an alkyl group or a substituted alkyl group and Y represents an aliphatic hydrocarbon residue, an aromatic hydrocarbon residue, a substituted aliphatic hydrocarbon residue, or a substituted aromatic hydrocarbon residue.

Examples of the esters are 2-hydroxyethyl methacrylate, 2-hydroxypropyl methacrylate, 2-hydroxyethyl acrylate, 2-hydroxypropyl acrylate, 2-hydroxybutyl methacrylate, p-hydroxyphenyl methacrylate, p-hydroxybenzyl methacrylate, 3-chloro-2-hydroxypropyl methacrylate, glycerin monomethacrylate, polyethylene glycol methacrylate, and polypropylene glycol methacrylate.

As monomers having a functional group containing an active hydrogen, there may also be used acrylic acid, methacrylic acid, acrylamide, allylamine, allyl alcohol, and the like, in addition to those mentioned above.

Examples of preferred monomers having a functional group containing an active hydrogen, are α,β-unsaturated carboxylic acid esters containing hydroxyl group such as 2-hydroxyethyl methacrylate, 2-hydroxypropyl methacrylate, 2-hydroxyethyl acrylate, and 2-hydroxypropyl acrylate.

The amount of these monomers having a functional group containing an active hydrogen added to the olefin polymer is usually 0.005–25% by weight, preferably 0.05–10% by weight from the point of wear resistance.

The addition of monomers having a functional group containing an active hydrogen to olefin polymers can be carried out by a radical addition reaction process which is normally employed.

For example, there may be employed a process which comprises melting an olefin polymer and adding thereto a monomer having a functional group containing an active hydrogen or a process which comprises dissolving an olefin polymer in a solvent and adding thereto a monomer having a functional group containing an active hydrogen. In either process, it is preferred to carry out the reaction in the presence of a radical initiator for efficient addition of the monomer having a functional group containing an active hydrogen. This addition reaction is usually carried out at a temperature of 60°–350° C. The amount of the radical initiator used is normally 0.01–20 parts by weight to 100 parts by weight of the olefin polymer. The radical initiator includes, for example, organic peroxides, organic peresters and azo compounds.

The ethylene content comprised in the olefin polymers to which the monomer having a functional group containing an active hydrogen has been added, is at least 30% by weight, preferably at least 50% by weight, more preferably at least 80% by weight. With increase in the ethylene content, the wear resistance of the resulting composition is improved. If the ethylene content is less than 30% by weight, the wear resistance of the composition deteriorates considerably.

The olefin polymers of component (C) having a functional group containing an active hydrogen, also include graft polymers obtained by grafting onto the olefin polymers, a copolymer comprising a monomer having a functional group containing an active hydrogen and a comonomer.

As the olefin polymers and the monomers having a functional group containing an active hydrogen in the above graft polymers, there may be used those which are referred to in the above discussion on the olefin polymers to which a monomer having a functional group containing an active hydrogen is added.

As the comonomer copolymerized with the monomer having a functional group containing an active hydrogen in the graft polymers, there may be used at least one monomer selected from α-olefins other than ethylene, vinyl carboxylates, acrylic esters, or methacrylic esters.

This graft polymer can be produced by conventional processes used for the graft modification of olefin polymers, for example, a process which utilizes the grafting reaction of a polymer having a peroxide bond in side chain with a polyolefin (Collection of Articles on Polymers, Vol. 44, No. 2, pages 89–95 (1987)).

Advantageously, the amount of the copolymer grafted onto the olefin polymer is 5–50% by weight, preferably 10–30% by weight of the graft polymer from the point of wear resistance. Furthermore, monomer content having a functional group containing an active hydrogen in the graft polymer, is usually 0.005–25% by weight, preferably 0.05–10% by weight from the point of wear resistance.

Among the olefin polymers comprising at least 30% by weight of ethylene and having a functional group containing an active hydrogen, the graft polymers are preferred and especially preferred are those which are obtained by grafting a copolymer of a monomer having a functional group containing an active hydrogen and a comonomer onto the olefin polymer, such as polyethylene, ethylene-propylene copolymer or ethylene-propylene-diene copolymer.

In the composition of the present invention, the olefin polymers of component (C) comprising at least 30% by weight of ethylene and a functional group containing an active hydrogen, may be used singly or in combination of two or more. The amount of the olefin polymers of component (C) is 0.5-20% by weight, preferably 1-10% by weight based on the total weight of the composition. If the amount is outside the above range, the wear resistance of the composition decreases and the effect of the present invention cannot be sufficient.

As polyethylenes of component (D) in the composition of the present invention, there may be used the ones which are well-known to those skilled in the art. Among the preferred polyethylenes, are those which have a number-average molecular weight of 2,000–1,000,000, a specific gravity of 0.91–0.98 and a melting point of 100°–140° C. Examples thereof, are commercially available polyethylene waxes, low-density polyethylenes (LDPE), linear low-density polyethylenes (LLDPE), high-density polyethylenes (HDPE), and ultra-high molecular weight polyethylenes (UHPE).

Of these, the preferred polyethylenes are LDPE which is an ethylene homopolymer having a number-average molecular weight of 20,000–500,000 and a density of 0.91–0.93 g/cm$^3$ and UHPE which is an ethylene homopolymer having a number-average molecular weight of 20,000–500,000 and a density of 0.93–0.96 g/cm$^3$ and the former is especially preferred.

The above polyethylenes may be used singly or in combination of two or more. The amount thereof is 0.2–10% by weight, preferably 1–5% by weight based on the total weight of the composition. If the amount is outside of the above range, the wear resistance decreases and the effect of the present invention cannot be sufficiently exhibited.

If necessary, the composition of the present invention may contain a tertiary amine to further improve the wear resistance. As the tertiary amine, there may be used a compound represented by the formula:

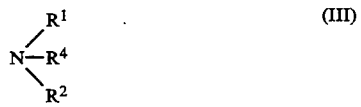

(III)

wherein $R^3$, $R^4$ and $R^5$ each represents an unsubstituted alkyl or substituted alkyl group of 1–22 carbon atoms or an unsubstituted aryl or substituted aryl group of 6–22 carbon atoms and may be identical or different.

Examples of these tertiary amines include butyldimethylamine, amyldimethylamine, hexyldimethylamine, heptyldimethylamine, octyldimethylamine, nonyldimethylamine, decyldimethylamine, undecyldimethylamine, dodecyldimethylamine, tridecyldimethylamine, tetradecyldimethylamine, pentadecyldimethylamine, cetyldimethylamine, stearyldimethylamine, behenyldimethylamine, dilaurylmonomethylamine, trioctylamine, trilaurylamine, cyclohexyldimethylamine, dimethylaniline, diethylaniline, dimethylbenzylamine, triphenylamine, diphenylmethylamine, dimethylnaphtylamine, N-laurylmorpholine, triethyldiamine, N,N,N',N'-tetramethylethylenediamine, and stearylamine to which 2 mols of ethylene oxide is added. Among them, preferred are those which have 10–40 carbon atoms from the point of wear resistance and especially preferred are dimethylstearylamine, dimethyllaurylamine, dilaurylmethylamine and trioctylamine.

These tertiary amines may be used singly or in combination of two or more. The amount thereof is usually 5% by weight or less, preferably 0.05–3% by weight based on the total weight of composition. If the amount is more than 5% by weight, the wear resistance of composition tends to decrease.

The wear-resistant polyoxymethylene resin composition of the present invention can be produced by melt kneading the necessary amounts of component (A), component (B), component (C) and component (D), and optionally if necessary, the tertiary amine, at a maximum resin temperature of 210° C. or higher for 0.5 minute or more. Known apparatuses normally used for kneading of molten resin such as kneader, roll mill, and extruder can be used as melt kneading machines. The use of an extruder is most suitable for the cutting-off of oxygen and maintaining a good working atmosphere. The extruder usable has no limitation and there may be used, for example, single-screw extruder, twin-screw extruder, vented extruder, unvented extruder and the like.

The maximum resin temperature, within the meaning of the present invention, defines an equilibrium resin temperature in melt kneading under certain conditions, which is sensed by a thermometer equipped in the system in the case in which the melt kneading machine is a batch type kneading machine, such as kneader or roll mill, and it defines an equilibrium temperature of a resin just after being discharged from an extruder in melt kneading under certain conditions in the case in which the melt kneading machine is an extruder.

In the present invention, the maximum resin temperature must be 210° C. or higher, preferably 220° C. or higher, more preferably 230° C. or higher. If this temperature is lower than 210° C., compositions having the desired wear resistance cannot be obtained. The melt kneading time, within the meaning of the present invention, defines the kneading time, after the resin temperature has reached the above-mentioned maximum resin temperature. Especially, when the melt kneading machine is an extruder, the melt kneading time is an average residence time in the state at which the resin temperature has reached the maximum resin temperature. The average residence time, within the meaning of the present invention, is the time required for the resin discharged from die, to become deepest in its color, after the addition of 5% by weight of a black pigment (acetylene black) to a raw material feed opening in the course of extrusion at the equilibrium resin temperature.

In the present invention, the time required for melt kneading is at least 0.5 minute, preferably 0.5–10 minutes, more preferably 1–5 minutes. If this time is less than 0.5 minute, compositions having the desired wear resistance are difficult to obtain and if it is more than 10 minutes, the coloration of the compositions tends to be conspicuous.

The process for the production of the composition of the present invention is not limited to those mentioned above. Known processes used for preparation of polyoxymethylene resin compositions can be optionally employed.

If necessary, there may be added to the composition of the present invention, additives which are customarily used as additives for plastics, such as antioxidants, light stabilizers, inorganic fillers and pigments. Furthermore, additive components normally used for polyoxymethylene resins such as polyamides, melamine, melamine derivatives, dicyandiamide, and calcium salts of fatty acids, may also be added.

Preferably antioxidants are those which have 3-methyl-4-hydroxy-5-t-butylphenyl group, Addition of such antioxidants at the time of melt kneading, results in remarkable improvement of residual coloration. Examples of these antioxidants are 3,9-bis[2-[3-(3-t-butyl-4-hydroxy-5-methylphenyl)propionyloxy]-1,1-dimethylethyl-2,4,8,10-tetraoxaspiro[5,5]undecane, triethylene glycol-bis[3-(3-t-butyl-5-methyl-4-hydroxyphenyl)-propionate], 1,6-hexanediol-bis[3-(3-t-butyl-5-methyl-4-hydroxyphenyl)propionate], pentaerythritoltetrakis[3-(3-t-butyl-5-methyl-4-hydroxyphenyl)propionate], octadecyl-3-(3-t-butyl-5-methyl-4-hydroxyphenyl)propionate], and N,N-hexamethylenebis-(3-t-butyl-5-methyl-4-hydroxy-hydrocinnamide). Among the preferred antioxidants, are 3,9-bis[2-[3-(3-t-butyl-4-hydroxy-5-methylphenyl)propionyloxy]-1,1-dimethylethyl-2,4,8,10-tetraoxaspiro[5,5]undecane, triethylene glycol-bis[3-(3-t-butyl-5-methyl-4-hydroxyphenyl)propionate] and 1,6-hexanediol-bis[3-(3-t-butyl-5-methyl-4-hydroxyphenyl)propionate].

Addition amount of these antioxidants is usually 0.3-2% by weight, preferably 0.8-1.5% by weight based on total weight of the composition, taking the residual coloration into consideration.

Furthermore, the wear-resistant polyoxymethylene resin composition of the present invention may be blended with conventional polyoxymethylene homopolymer, copolymer, branched polymer or block copolymer.

The wear-resistant polyoxymethylene resin composition of the present invention can be normally used for sliding members to which polyoxymethylene resins are usually applied, such as gear, bearing, lever, key stem, cam, ratchet, and roller. Especially, the resin composition of the present invention is suitable for guide roller of VTR, gear and bearing.

According to the present invention, polyoxymethylene resin composition having excellent wear resistance can be obtained by blending polyoxymethylene resin with a polyfunctional isocyanate compound, a specific olefin polymer having a functional group containing an active hydrogen, and polyethylene at a given ratio and melt kneading the blend under specific conditions.

This polyoxymethylene resin composition has excellent wear resistance as well as the well-balanced mechanical properties which are inherent in polyoxymethylene resin and hence can be suitably used as materials for sliding parts in the fields of precision machines, office automation devices and automobiles.

The following nonlimiting examples will explain the present invention in greater detail.

EXAMPLES 1-22

Both ends-acetylated polyoxymethylene homopolymer powder having an inherent viscosity of 1.2 (measured on a solution prepared by dissolving 0.1% by weight of the polymer in p-chlorophenol containing 2% by weight of α-pinene at 60° C.) and a melt index of 9.0 g/10 min [ASTM D-1238-57T (condition E)] was dried at 80° C. for 3 hours. This was blended with an olefin polymer having a functional group containing an active hydrogen as shown in Table 1, an isocyanate compound (protected from water in the air) as shown in Table 1, and a polyethylene as shown in Table 1 (which had been dried at 80° C. for 3 hours) in nitrogen atmosphere. The resulting blend was melt kneaded by an L/D25 vented twin screw extruder set at 200° C. under the conditions of a screw speed of 100 rpm, a discharging rate of 3 kg/hr, a maximum resin temperature of 210°–220° C., and a kneading time of 0.5–0.7 minute to prepare resin compositions having the composition as shown in Table 1 and the compositions were further pelletized.

The pellets were dried at 80° C. for 3 hours and then molded into a cylinder of 26 mm in outer diameter, 20 mm in inner diameter and 17 mm in depth by a three ounce molding machine set at a cylinder temperature of 200° C. under the conditions of a mold temperature of 80° C. and a cooling time of 20 seconds to obtain a test piece.

This test piece was subjected to measurement of wear in accordance with wear resistance testing method of JIS K-7218 using a thrust type frictional abrasion tester (manufactured by Toyo Seiki Co.) under the conditions: partner material: steel ($45C); traveling distance: 1000 km; linear speed: 80 cm/sec; and face pressure: 5 kg/cm$^2$. The wear was total wear of the test piece and the partner material. The results are shown in Table 1.

TABLE 1

| | Components of resin composition | | | | | | | |
|---|---|---|---|---|---|---|---|---|
| | Content of polyoxymethylene homopolymer (wt %) | Isocyanate compound | | Olefin polymer having a functional group containing an active hydrogen | | Polyethylene | | Evaluation |
| | | Kind | Content (wt %) | Kind | Content (wt %) | Kind | Content (wt %) | Wear ($\times 10^{-9}$ g/m) |
| Example | | | | | | | | |
| 1 | 89 | B-1 | 0.5 | C-1 | 10 | LDPE-1 | 0.5 | 5.0 |
| 2 | 88.5 | B-1 | 1.0 | C-1 | 10 | LDPE-1 | 0.5 | 2.0 |
| 3 | 86.5 | B-1 | 3.0 | C-1 | 10 | LDPE-1 | 0.5 | 1.8 |
| 4 | 84.5 | B-1 | 5.0 | C-1 | 10 | LDPE-1 | 0.5 | 4.8 |
| 5 | 89 | HMDI | 0.5 | C-1 | 10 | LDPE-1 | 0.5 | 6.8 |
| 6 | 88.5 | B-2 | 1.0 | C-1 | 10 | LDPE-1 | 0.5 | 2.1 |
| 7 | 88.5 | IPDI | 1.0 | C-1 | 10 | LDPE-1 | 0.5 | 3.8 |
| 8 | 98 | MDI | 1.0 | C-2 | 0.5 | LDPE-1 | 0.5 | 9.8 |
| 9 | 98.3 | MDI | 1.0 | C-2 | 0.5 | LDPE-1 | 0.2 | 16 |
| 10 | 97.5 | MDI | 1.0 | C-2 | 1.0 | LDPE-1 | 0.2 | 7.0 |
| 11 | 93.5 | MDI | 1.0 | C-2 | 5.0 | LDPE-1 | 0.5 | 6.8 |

TABLE 1-continued

| | Components of resin composition | | | | | | | Evaluation |
|---|---|---|---|---|---|---|---|---|
| | Content of polyoxy-methylene homo-polymer (wt %) | Isocyanate compound | | Olefin polymer having a functional group containing an active hydrogen | | Polyethylene | | Wear ($\times 10^{-9}$ g/m) |
| | | Kind | Content (wt %) | Kind | Content (wt %) | Kind | Content (wt %) | |
| 12 | 88.5 | MDI | 1.0 | C-2 | 10 | LDPE-1 | 0.5 | 6.0 |
| 13 | 78.5 | MDI | 1.0 | C-2 | 20 | LDPE-1 | 0.5 | 7.5 |
| 14 | 88.5 | MDI | 1.0 | C-3 | 10 | LDPE-1 | 0.5 | 2.5 |
| 15 | 88.5 | MDI | 1.0 | C-4 | 10 | LDPE-1 | 0.5 | 2.0 |
| 16 | 93.5 | B-1 | 1.0 | C-5 | 5.0 | LDPE-1 | 0.5 | 5.0 |
| 17 | 93 | B-1 | 1.0 | C-5 | 5.0 | LDPE-1 | 1.0 | 2.1 |
| 18 | 89 | B-1 | 1.0 | C-5 | 5.0 | LDPE-1 | 5.0 | 1.8 |
| 19 | 84 | B-1 | 1.0 | C-5 | 5.0 | LDPE-1 | 10 | 2.5 |
| 20 | 93 | B-1 | 1.0 | C-5 | 5.0 | LLDPE-1 | 1.0 | 2.8 |
| 21 | 94 | B-1 | 1.0 | C-5 | 5.0 | UHPE | 1.0 | 1.6 |
| 22 | 89 | B-1 | 1.0 | C-5 | 5.0 | UHPE | 5.0 | 1.0 |

[Note]
B-1: Modified trimer of HMDI having isocyanurate ring.
B-2: Modified trimer of IPDI having isocyanurate ring.
HMDI: Hexamethylene diisocyanate.
IPDI: Isophorone diisocyanate.
MDI: Diphenylmethane diisocyanate.
C-1: Ethylene-methacrylic acid copolymer (ethylene unit 90 wt %).

C-2: Ethylene-propylene-2-hydroxyethyl methacrylate copolymer ($\overline{Mn}$ 100,000; ethylene unit 30 wt %; propylene unit 60 wt %).

C-3: Ethylene-propylene-2-hydroxyethyl methacrylate copolymer ($\overline{Mn}$ 100,000; ethylene unit 50 wt %; propylene unit 40 wt %).

C-4: Ethylene-propylene-2-hydroxyethyl methacrylate copolymer ($\overline{Mn}$ 100,000; ethylene unit 80 wt %; propylene unit 10 wt %).

C-5: Polyethylene wax ($\overline{Mn}$ 2,000; AV 20 mgKOH/g).

LDPE-1: Low-density polyethylene ($\overline{Mn}$ 20,000).

LLDPE-1: Linear low-density polyethylene ($\overline{Mn}$ 50,000; butene-1 unit 5 wt %).

UHPE: High molecular weight polyethylene ($\overline{Mn}$ 500,000)

COMPARATIVE EXAMPLES 1–15

In the same manner as in Examples 1–22, polyoxymethylene resin compositions having the composition as shown in Table 2 were prepared and wear thereof was measured. The results are shown in Table 2.

EXAMPLES 23–31

A polyoxymethylene copolymer having an inherent viscosity of 1.1 and a melt index of 10.0 g/10 min, containing 2.8 wt % of oxyethylene group and dried at 80° C. for 3 hours was blended with isocyanate compound, olefin polymer having a functional group containing an active hydrogen, polyethylene, antioxidant and tertiary

TABLE 2

| | Components of resin composition | | | | | | | Evaluation |
|---|---|---|---|---|---|---|---|---|
| | Content of polyoxy-methylene homopolymer (wt %) | Isocyanate compound | | Olefin polymer having a functional group containing an active hydrogen | | Polyethylene | | Wear ($\times 10^{-9}$ g/m) |
| | | Kind | Content (wt %) | Kind | Content (wt %) | Kind | Content (wt %) | |
| Comparative Example | | | | | | | | |
| 1 | 89.5 | — | — | C-1 | 10 | LDPE-1 | 0.5 | 25 |
| 2 | 89.4 | B-1 | 0.1 | C-1 | 10 | LDPE-1 | 0.5 | 20 |
| 3 | 82.5 | B-1 | 7.0 | C-1 | 10 | LDPE-1 | 0.5 | 21 |
| 4 | 89 | TMI | 0.5 | C-1 | 10 | LDPE-1 | 0.5 | 25 |
| 5 | 99 | B-1 | 0.5 | — | — | LDPE-1 | 0.5 | 53 |
| 6 | 98.9 | B-1 | 0.5 | C-1 | 0.1 | LDPE-1 | 0.5 | 45 |
| 7 | 74 | B-1 | 0.5 | C-1 | 25 | LDPE-1 | 0.5 | 21 |
| 8 | 98 | MDI | 1.0 | C-6 | 0.5 | LDPE-1 | 0.5 | 36 |
| 9 | 98.5 | MDI | 1.0 | C-2 | 0.5 | — | — | 67 |
| 10 | 98.4 | MDI | 1.0 | C-2 | 0.5 | LDPE-1 | 0.1 | 65 |
| 11 | 83.5 | MDI | 1.0 | C-2 | 0.5 | LDPE-1 | 15 | 22 |
| 12 | 98 | MDI | 1.0 | C-2 | 0.5 | LLDPE-2 | 0.5 | 19 |
| 13 | 99.5 | — | — | C-2 | 0.5 | — | — | 60 |
| 14 | 99 | MDI | 1.0 | — | — | — | — | 93 |
| 15 | 99.5 | — | — | — | — | LDPE-1 | 0.5 | 77 |

[Note]
B-1: MDI, C-2, and LPDE-1 were the same as in Table 1.
TMI: Toluene monoisocyanate.

C-6: Ethylene-propylene-2-hydroxyethyl methacrylate copolymer ($\overline{Mn}$ 100,000; ethylene unit 10 wt %; propylene unit 80 wt %).
LLDPE-2: Linear low-density polyethylene (propylene unit 20 wt %).

amine as shown in Table 3. The blend was melt kneaded by the same extruder as used in Examples 1–22 under the conditions of a cylinder temperature of 210° C., a maximum resin temperature of 225°–235° C., a kneading time of 2–5 minutes, and discharging rate of 3 kg/hr to obtain a polyoxymethylene resin composition having the composition as shown in Table 3 and then this composition was pelletized.

The resulting pellets were molded into a test piece in the same manner as in Examples 1–22 and this test piece was subjected to measurement of wear (total wear of the test piece and partner material) under the conditions of a face pressure of 2 kg/cm², linear speed of 10 cm/sec and a traveling distance of 500 km using the same material as of the test piece as a partner material. Furthermore, the composition was retained for 15 minutes in a three ounce molding machine set at a cylinder temperature of 200° C. and color difference ($\Delta E$) was measured by a color tester manufactured by Suga Tester Co. The results are shown in Table 3.

COMPARATIVE EXAMPLES 16–20

In the same manner as in Examples 23–31, polyoxymethylene resin compositions having composition as shown in Table 4 were prepared and wear and color difference were measured. The results are shown in Table 4.

TABLE 4

| | Content of polyoxymethylene copolymer (wt %) | Components of resin composition | | | | | | | | Evaluation | |
|---|---|---|---|---|---|---|---|---|---|---|---|
| | | Isocyanate compound | | Olefin polymer having a functional group containing an active hydrogen | | Polyethylene | | Content of stearyl-dimethyl-amine (wt %) | Antioxidant | | Wear ($\times 10^{-9}$ g/m) | Color difference ($\Delta E$) |
| | | Kind | Content (wt %) | Kind | Content (wt %) | Kind | Content (wt %) | | Kind | Content (wt %) | | |
| Comparative Example | | | | | | | | | | | | |
| 16 | 88 | B-2 | 2.0 | C-11 | 10 | — | — | — | — | — | 92 | 30 |
| 17 | 90 | — | — | C-11 | 10 | — | — | — | — | — | 89 | 15 |
| 18 | 98 | — | — | — | — | — | — | 2.0 | — | — | 240 | 7 |
| 19 | 100 | — | — | — | — | — | — | — | — | — | 250 | 1 |
| 20 | 98 | B-2 | 2.0 | — | — | — | — | — | — | — | 239 | 30 |

[Note]
B-2 was the same as in Table 1.
C-11 was the same as in Table 3.

EXAMPLE 32–40

91 Parts by weight of the polyoxymethylene copolymer used in Example 23 was blended with (1) 2 parts by weight of modified trimmer of HMDI having isocyanurate ring, (2) 5 parts by weight of olefin polymer which was an addition product of 2 parts by weight of 2-hydroxyethyl methacrylate to 98 parts by weight of ethylene-propylene-diene copolymer having five double bonds per 1000 carbon atoms, having a Mooney viscosity of 85, and containing 50% by weight of ethylene unit, and (3) 2 parts by weight of LDPE ($\overline{Mn}$) 20,000) in the same manner as in Example 1. The blend was pelletized by the same extruder as used in Example

TABLE 3

| | Content of polyoxymethylene copolymer (wt %) | Components of resin composition | | | | | | | | Evaluation | |
|---|---|---|---|---|---|---|---|---|---|---|---|
| | | Isocyanate compound | | Olefin polymer having a functional group containing an active hydrogen | | Polyethylene | | Content of stearyl-dimethyl-amine (wt %) | Antioxidant | | Wear ($\times 10^{-7}$ g/m) | Color difference ($\Delta E$) |
| | | Kind | Content (wt %) | Kind | Content (wt %) | Kind | Content (wt %) | | Kind | Content (wt %) | | |
| Example | | | | | | | | | | | | |
| 23 | 92 | B-1 | 1.0 | C-7 | 5 | LDPE-2 | 2.0 | — | — | — | 8.0 | 35 |
| 24 | 92 | B-1 | 1.0 | C-8 | 5 | LDPE-2 | 2.0 | — | — | — | 3.0 | 37 |
| 25 | 92 | B-1 | 1.0 | C-9 | 5 | LDPE-2 | 2.0 | — | — | — | 2.5 | 39 |
| 26 | 92 | B-1 | 1.0 | C-10 | 5 | LDPE-2 | 2.0 | — | — | — | 6.3 | 40 |
| 27 | 97 | B-2 | 2.0 | C-11 | 10 | LDPE-2 | 1.0 | — | — | — | 3.2 | 30 |
| 28 | 85 | B-2 | 2.0 | C-11 | 10 | LDPE-2 | 1.0 | 2.0 | — | — | 1.1 | 28 |
| 29 | 86 | B-2 | 2.0 | C-11 | 10 | LDPE-2 | 1.0 | — | E-1 | 1.0 | 2.9 | 5 |
| 30 | 84 | B-2 | 2.0 | C-11 | 10 | LDPE-2 | 1.0 | 2.0 | E-1 | 1.0 | 1.0 | 4 |
| 31 | 84 | B-2 | 2.0 | C-11 | 10 | LDPE-2 | 1.0 | 2.0 | E-2 | 1.0 | 1.0 | 35 |

[Note]
B-1 and B-2 were the same as in Table 1.

C-7: Polymer prepared by adding 0.005 wt % of acrylamide to LDPE ($\overline{Mn}$ 50,000).

C-8: Polymer prepared by adding 0.05 wt % of acrylamide to LDPE ($\overline{Mn}$ 50,000).

C-9: Polymer prepared by adding 10 wt % of acrylamide to LDPE ($\overline{Mn}$ 50,000).

C-10: Polymer prepared by adding 25 wt % of acrylamide to LDPE ($\overline{Mn}$ 50,000).

C-11: Polymer prepared by adding 20 wt % of styrene-2-hydroxypropyl methacrylate copolymer on ethylene-propylene copolymer ($\overline{Mn}$ 50,000) (ethylene unit 50 wt %; 2-hydroxypropyl methacrylate unit 3 wt %; propyl unit 20 wt %).

LDPE-2: Low-density polyethylene ($\overline{Mn}$ 30,000).
E-1: 3,9-Bis[2-[3-(3-t-butyl-4-hydroxy-5-methylphenyl)propionyloxy]-1,1-dimethylethyl]-2,4,8,10-tetraoxaspiro[5,5]undecane.
E-2: 2,2'-Methylenebis(4-methyl-6-t-butylphenol).

1 at a discharging rate of 3 kg/hr and under the conditions as shown in Table 5. The resulting pellets were molded into a test piece and wear was measured in the same manner as in Example 23. Color difference was also measured in the same manner as in Example 23. The results are shown in Table 5.

From the results of Examples 32–40 and Comparative Examples 21-23 shown in Table 5, it can be seen that a maximum resin temperature of 210° C. or higher and a kneading time of 0.5 minute or more are necessary for obtaining wear-resistant polyoxymethylene resin compositions.

TABLE 5

| | Maximum resin temp. (°C.) | Kneading time (min) | Wear ($\times 10^{-7}$ g/m) | Color difference ($\Delta E$) |
|---|---|---|---|---|
| Example 32 | 210 | 0.5~1 | 8.2 | 15 |
| Example 33 | 210 | 2~3 | 7.9 | 18 |
| Example 34 | 210 | 4~5 | 6.3 | 20 |
| Example 35 | 210 | 9~10 | 5.1 | 57 |
| Example 36 | 220 | 2~3 | 4.5 | 26 |
| Example 37 | 230 | 2~3 | 4.0 | 30 |
| Example 38 | 235 | 2~3 | 3.2 | 31 |
| Example 39 | 240 | 2~3 | 2.8 | 35 |
| Example 40 | 235 | 12~13 | 3.0 | 89 |
| Comparative Example 21 | 205 | 2~3 | 23 | 17 |
| Comparative Example 22 | 230 | 0.2~0.3 | 32 | 21 |
| Comparative Example 23 | 205 | 0.2~0.3 | 45 | 13 |

What is claimed is:

1. A wear resistant polyoxymethylene resin composition which comprises
   (A) 65–98.8% by weight based on the total weight of the composition of a polyoxymethylene resin,
   (B) 0.2–5% by weight based on the total weight of the composition of a trifunctional isocyanate compound,
   (C) 0.5–20% by weight based on the total weight of the composition of a graft olefin polymer which is obtained by grafting onto an olefin polymer containing 30% by weight or more of ethylene, a copolymer comprising a monomer having a functional group containing an active hydrogen and a comonomer, and
   (D) 0.2–10% by weight based on the total weight of the composition of polyethylene.

2. The composition according to claim 1, wherein the weight of trifunctional isocyanate compound (B) is 0.5–4.0%.

3. The composition according to claim 1, wherein the olefin polymer containing 30% by weight or more of ethylene is an ethylene copolymer which has an average molecular weight $\overline{Mn}$ of 20,000–500,000.

4. The composition according to claim 1, wherein the olefin polymer is an ethylene copolymer comprising at least 50% by weight of ethylene.

5. The composition according to claim 1, wherein the polyethylene (D) is a polyethylene having a number-average molecular weight of 20,000–1,000,000, a specific gravity of 0.91–0.98 and a melting point of 100°–140° C.

6. The composition according to claim 1, which further comprises a tertiary amine represented by the formula:

wherein $R^3$, $R^4$, and $R^5$, which may be identical or different each represents an unsubstituted or substituted alkyl group of 1–22 carbon atoms, or an unsubstituted or substituted aryl group of 6–22 carbon atoms.

7. The composition according to claim 6, wherein the tertiary amine is present in an amount of 5% by weight or less based on total amount of the composition.

8. A method for producing a wear-resistant polyoxymethylene resin composition of claim 1 which comprises melt-kneading a mixture comprising
   (A) 65–98.8% by weight of a polyoxymethylene resin,
   (B) 0.2–5.0% by weight of a trifunctional isocyanate compound,
   (C) 0.5–20% by weight of a graft olefin polymer which is obtained by grafting onto an olefin polymer containing 30% by weight or moire of ethylene, a copolymer comprising a monomer having a functional group containing an active hydrogen and a comonomer, and
   (D) 0.2–10% by weight of polyethylene at a maximum resin temperature of 210° C. or higher for 0.5 minute or more.

9. The composition according to claim 1, wherein the polyoxymethylene resin (A) is an oxymethylene homopolymer or an oxymethylene copolymer.

10. The composition according to claim 1, wherein the trifunctional isocyanate compound (B) is a compound having three isocyanate groups or isothiocyanate groups.

11. The composition according to claim 1, wherein the functional group containing an active hydrogen contained in graft olefin polymer (C) is selected from a hydroxy group, a carboxyl group, an amide group, an amino group or a mixture thereof.

12. The composition according to claim 1, wherein the olefin polymer containing 30% by weight or more of ethylene is an ethylene copolymer which has an average molecular weight $\overline{Mn}$ of 30,000–200,000.

13. The composition according to claim 1, wherein the monomer having a functional group containing an active hydrogen is an $\alpha,\beta$-unsaturated carboxylic acid ester containing a hydroxyl group which is represented by formula (II):

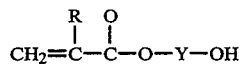

wherein R represents a hydrogen atom, an alkyl group or a substituted alkyl group and Y represents an aliphatic hydrocarbon residue, an aromatic hydrocarbon residue, a substituted aliphatic hydrocarbon residue, or a substituted aromatic hydrocarbon residue.

14. The composition according to claim 1, wherein the comonomer is at least one monomer of an $\alpha$-olefin other than ethylene, a vinyl carboxylate, an acrylic ester or a methacrylic ester.

* * * * *